US006947641B2

(12) United States Patent
Durkin et al.

(10) Patent No.: US 6,947,641 B2
(45) Date of Patent: Sep. 20, 2005

(54) APPARATUS FOR FILTERING OPTICAL RADIATION AT AN OPERATING WAVELENGTH

(75) Inventors: Michael Kevan Durkin, Southampton (GB); Mikhail Nickolaos Zervas, Southampton (GB)

(73) Assignee: Southampton Photonics LTD, Southampton (GB)

( * ) Notice: Subject to any disclaimer, the term of this patent is extended or adjusted under 35 U.S.C. 154(b) by 0 days.

(21) Appl. No.: 10/494,844

(22) PCT Filed: Nov. 6, 2002

(86) PCT No.: PCT/GB02/05028

§ 371 (c)(1),
(2), (4) Date: May 6, 2004

(87) PCT Pub. No.: WO03/040767

PCT Pub. Date: May 15, 2003

(65) Prior Publication Data

US 2005/0152645 A1      Jul. 14, 2005

(30) Foreign Application Priority Data

Nov. 6, 2001   (GB) ................................. 0126740

(51) Int. Cl.[7] ............................................. G02B 6/34
(52) U.S. Cl. ........................... 385/37; 385/42; 385/50; 359/569
(58) Field of Search ............................ 385/37, 39, 42, 385/50; 359/569, 575

(56) References Cited

U.S. PATENT DOCUMENTS 6,314,221 B1 * 11/2001 Riant et al. ................... 385/37
6,321,008 B1 * 11/2001 Riant et al. ................... 385/37
6,445,852 B1    9/2002 Feced et al.
6,823,111 B2 * 11/2004 Jette et al. ..................... 385/37

OTHER PUBLICATIONS

Dispersion-freefibre Bragg gratings, Morten Ibsen, Periklis Petropoulos, Michalis N. Zervas, Ricardo Facid, Optical Society of America, OCID, Year 2000.
Bidirectional Wavelength Add-Drop Multiplexer Using Miltiport Optical Circulators and Fiber Bragg Gratings, Juhgho Kim, Byoungho Lee, IEEE Photonics Technology Letters, vol. 12, No. 5, May 2000, pp. 561-563.
An Efficient Inverse Scatttering Algorithm for the Design of Nonuniform Fiber Bragg Gratings, Recardo Feced, Michalis N. Zervas, and Miquel A. Muriel, Journal of Quantum Eletronics, vol. 35, No. 8, Aug. 1999, pp. 1105-1115.

* cited by examiner

Primary Examiner—Phan T. H. Palmer
(74) Attorney, Agent, or Firm—John S. Reid; Reidlaw, L.L.C.

(57) ABSTRACT

Apparatus for filtering optical radiation at an operating wavelength (19), which apparatus comprises a grating (1) written into a waveguide (2), and which grating (1) has a first end (3), a second end (91), a first bandwidth (24), a maximum re-flectivity (29), a first group delay variation (17) defined with respect to the first end (3), and a second group delay variation (18) defined with respect to the second end (91), wherein the first and second group delay variations (17), (18) are with respect to the first bandwidth (24), the maximum reflectivity (29) is greater than 50%, the first group delay variation (17) is between 0.1 ps and 100 ps, and the second group delay variation (18) is between 0.1 ps and 100 ps.

30 Claims, 16 Drawing Sheets

APPARATUS FOR FILTERING OPTICAL RADIATION AT AN OPERATING WAVELENGTH

CROSS REFERENCE TO RELATED APPLICATIONS

This application is a U.S. National Stage filing of Patent Cooperation Treaty ("PCT") application serial number PCT/GB02/05028, filed 6 Nov. 2002 with the International Bureau of the World Intellectual Property Organization ("WIPO"), via the European Patent Office ("EPO"), and which was published in English under PCT Article 21(2). PCT application serial number PCT/GB02/05028 designates the United States of America. PCT application serial number PCT/GB02/05028 in turn claims priority to United Kingdom (Great Britain) Patent Application Serial Number GB0126740.0, filed 6 Nov. 2001 in the U.K., both of which are hereby incorporated by reference herein in their entirety.

FIELD OF INVENTION

This invention relates to apparatus for filtering optical radiation at an operating wavelength. The apparatus may use fibre Bragg gratings.

BACKGROUND TO THE INVENTION

High speed, high capacity optical communication systems require high performance devices that introduce minimum degradation. Such devices are required, for example, to introduce minimal insertion losses and should show no spurious reflection peaks or unwanted dispersion slopes. In many applications such as dense wavelength division multiplexing (WDM) transmission systems and satellite communications, optical amplifiers and transmitters, optical filters having ideal amplitude and phase responses are desired in order to maximize bandwidth utilization or to optimise the filtering function. Fibre Bragg gratings are extremely versatile optical components that can provide a large number of filtering functions.

Conventional fibre Bragg gratings are designed using Fourier Transform methods to determine line spacing and strength, and are manufactured using an ultra violet (UV) laser and a phase mask in order to inscribe lines onto an optical fibre. The resulting series of lines creates a filter that in many instances has a frequency response that is not closely matched to the optimal frequency response for the application.

High-speed, high-capacity optical fibre communication systems depend critically on the availability of high performance optical filters to accomplish a number of functions such as selection of closely packed wavelength-division-multiplexed channels or efficient compensation of dispersion over communication links. To this end, there is a strong demand for grating-based optical devices that can be designed and manufactured such that their response is tailored as close to an ideal response as possible. The technology of UV-written fibre gratings has now reached the necessary maturity to implement these high performance filters. There are a number of methods and different approaches in designing high quality grating devices. Among them, Fourier-Transform based and Electromagnetic Inverse Scattering (IS) techniques are known to offer a great variety of possibilities for the design of gratings with various degrees of accuracy.

In order to increase bandwidth efficiency, today's high-speed, high-capacity optical fibre communication systems tend either to decrease the wavelength separation between adjacent wavelength channels and to increase the numbers of channels, or to increase the bandwidth of each wavelength channel. An example of the former is 10 GBit/s data rates on a 25 GHz grid. An example of the latter is 40 GBit/s data rates on a 100 GHz grid. Today's optical filters for inclusion into optical add-drop multiplexers and interleavers for both systems are difficult to design and manufacture. The filters either have insufficient sideband suppression, non-ideal dispersion characteristics, or are insufficiently flat over their bandwidth. It has been recognised that fibre Bragg grating filters that can be designed to meet the required performance are often too long and are consequently difficult to package.

The group delay of a filter is an important parameter that has a significant influence on the distortion of a pulse and on the signal to noise ratio of a communication channel through which pulses travel. The group delay at a wavelength $\lambda_0$ corresponds to the time taken for optical energy carried by an infinitesimally spaced group of wavelengths around $\lambda_0$ to be reflected by the filter. It is important that the group delay is approximately constant over the pass band of the filter—that is, that the time taken for each wavelength component in the pulse that is to be reflected (by a grating) is constant. Pulses reflected by such filters which in addition have a substantially constant amplitude response across the filter's passband will not be distorted because each wavelength component of the pulse suffers approximately the same time delay.

Fibre Bragg gratings can be designed to minimize the group delay variation within the bandwidth of the optical filter and to have a near ideal amplitude response. However, 50 GHz or 25 GHz filters designed according to existing theories can be 100 or 150 mm long or even longer depending on the exact spectral shape (squareness etc) of the filters.

Many groups worldwide have looked at this problem and there are many papers on how to design gratings to achieve near ideal performance in both amplitude and group delay performance.

Prior art gratings that are designed and manufactured to have low dispersion, are very long, and more importantly, they are uni-directional. That is, the dispersion characteristic for light input into one end of the grating is optimised at the expense of the dispersion characteristic for light input into the other end of the grating. The uni-directionality is a disadvantage for use in add-drop multiplexers where a single grating is used per added/dropped channel and the dispersion characteristics from both ends are important. However, prior-art gratings are so uni-directional that add-drop multiplexers are designed using one grating to drop a channel and a second grating to add a channel. These gratings are typically separated by an isolator which is a relatively expensive component.

It is an aim of the present invention to provide apparatus for filtering optical radiation at an operating wavelength, which apparatus uses a grating that has the required bi-directional spectral characteristics.

SUMMARY OF THE INVENTION

According to a non-limiting embodiment of the present invention there is provided apparatus for filtering optical radiation at an operating wavelength, which apparatus comprises a grating written into a waveguide, and which grating has a first end, a second end, a first bandwidth, a maximum reflectivity, a first group delay variation defined with respect to the first end, and a second group delay variation defined with respect to the second end, wherein the first and second group delay variations are with respect to the first bandwidth, the maximum reflectivity is greater than 50%, the first group delay variation is between 0.1 ps and 100 ps, and the second group delay variation is between 0.1 ps and 100 ps.

The maximum reflectivity may be greater than 90%. The maximum reflectivity may be greater than 99%. The maximum reflectivity may be greater than 99.9%.

The first group delay variation may be between 0.1 ps and 50 ps, and the second group delay variation may be between 0.1 ps and 50 ps. The first group delay variation may be between 0.1 ps and 20 ps, and the second group delay variation may be between 0.1 ps and 20 ps. The first group delay variation may be between 0.1 ps and 5 ps, and the second group delay variation may be between 0.1 ps and 5 ps.

The grating may include a first reflector having a first refractive index profile, and a second reflector having a second refractive index profile. The first end may be connected to the first reflector and the first reflector may be connected to the second reflector. The grating may have a first impulse response defined with respect to the first end. The first refractive index profile may be proportional to a truncation of the first impulse response.

The second refractive index profile may be apodised. The second refractive index profile may be symmetric or asymmetric about its centre.

The second refractive index profile may be bell shaped, Gaussian shaped, have a Blackman apodised profile, a sinc profile, or a raised cosine profile. It is preferred that the first reflector and the second reflector are contiguous. It is preferred that there are no discontinuities between the first and the second refractive index profiles.

The grating may be characterised by a first group delay defined with respect to the first end. The first and second reflectors may be configured to optimise the first group delay.

The first and second reflectors may be configured such that the first group delay varies substantially linearly with wavelength over the first bandwidth.

It is preferable that the first and second reflectors are configured such that the first group delay has a substantially zero linear variation with wavelength over the first bandwidth.

The grating may have a first reflectivity profile defined with respect to the first end, and wherein the first and second reflectors are configured to optimise the first reflectivity profile. It is preferable that the first reflectivity profile is substantially uniform over the first bandwidth and rolls off sharply at the edges of the first bandwidth.

The grating may have a second impulse response defined with respect to the second end. The grating may comprise a third reflector connected to the second reflector, and the third reflector may have a third refractive index modulation which is proportional to a truncation of the second impulse response.

The grating may have a second group delay defined with respect to the second end, and wherein the second and third reflectors are configured to optimise the second group delay.

The grating may have a second reflectivity profile defined with respect to the second end, and the second and third reflectors may be configured to optimise the second reflectivity profile.

The grating may reflect at a single wavelength band.

The grating may reflect at a plurality of wavelength bands. It is preferred that the average group delays of at least two of these wavelength bands are not equal to each other.

At least a portion of each of the first and third reflectors may be symmetrically disposed about the second reflector.

The grating may comprise a total refractive index profile, which total refractive index profile comprises the first, second and third refractive index profiles. The total refractive index profile may be substantially symmetric about its centre.

The grating may comprise a central wavelength, a second bandwidth, an effective index, a first reflector having a first refractive index profile, and a second reflector having a second refractive index profile. The first reflector may be connected to the second reflector, and the first reflector may comprise at least one lobe having a width substantially equal to the central wavelength squared divided by the product of the effective index and the sum of the first and second bandwidths. The first bandwidth may be a −0.1 dB bandwidth and the second bandwidth may be a −40 dB bandwidth.

The grating may comprise a third reflector having a third refractive index profile, wherein the second reflector is connected to the third reflector. The third reflector may comprise at least one lobe having a width substantially equal to the central wavelength squared divided by the product of the effective index and the sum of the first and the second bandwidths.

The grating may comprise a first reflector having a first refractive index profile, and a second reflector having a second refractive index profile, wherein the first reflector is connected to the second reflector. The grating may have a first frequency response defined with respect to the first end. The first refractive index profile may be proportional to a truncation of the inverse Fourier Transform of the first frequency response. The grating may comprise a third reflector having a third refractive index profile and the second reflector may be connected to both the first reflector and the third reflector. The grating may have a second frequency response defined with respect to the second end. The third refractive index profile may be proportional to a truncation of the inverse Fourier Transform of the second frequency response.

The grating may be defined by a length over which its refractive index is modulated. The length may be between 5 mm and 50 mm. The first bandwidth may be between 0.01 nm and 5 nm.

The grating may be symmetrical in each of the preceding embodiments.

The apparatus of the invention may comprise a first coupler, the grating being connected to the first coupler. The first coupler is preferably a circulator. The apparatus may be used to add or drop wavelength channels in an optical telecommunication network.

The apparatus may comprise a second coupler connected to the grating. The second coupler is preferably a circulator. This apparatus may be used as an add-drop multiplexer for dropping a wavelength channel and adding a wavelength channel at the same wavelength. It is preferable that the grating has substantially zero dispersion at the operating wavelength measured from both the first end and the second end.

BRIEF DESCRIPTION OF THE DRAWINGS

Embodiments of the invention will now be described solely by way of example and with reference to the accompanying drawings in which.

DETAILED DESCRIPTION OF PREFERRED EMBODIMENTS OF THE INVENTION

Figure 1:
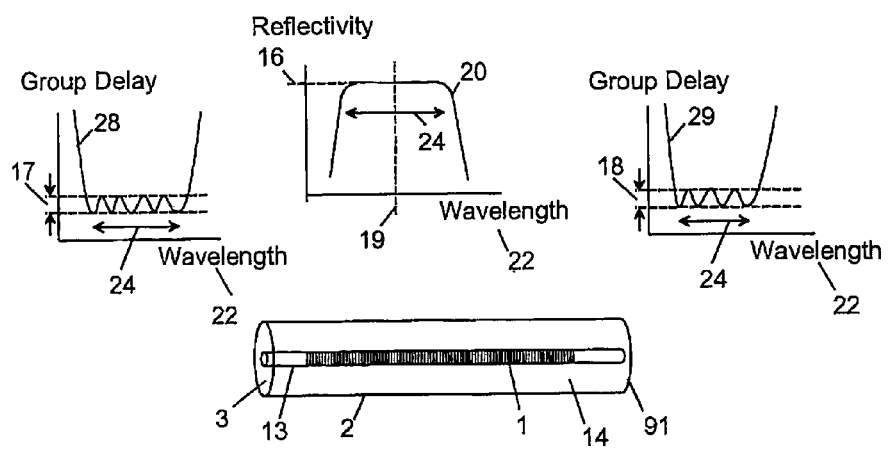
FIG. 1 shows apparatus for filtering optical radiation at an operating wavelength according to the present invention.

Referring to FIG. 1, there is shown apparatus for filtering optical radiation at an operating wavelength 19, which apparatus comprises a grating 1 written into a waveguide 2, and which grating 1 has a first end 3, a second end 91, a first bandwidth 24, a maximum reflectivity 16, a first group delay variation 17 defined with respect to the first end 3, and a second group delay variation 18 defined with respect to the second end 91, wherein the first and second group delay variations 17, 18 are with respect to the first bandwidth 24, the maximum reflectivity 16 is greater than 50%, the first group delay variation 17 is between 0.1 ps and 100 ps, and the second group delay variation 18 is between 0.1 ps and 100 ps.

FIG. 1 also shows a reflectivity 20 plotted versus wavelength 22, and first and second group delays 28, 29, which are also plotted versus wavelength 22. The first group delay 28 is the group delay that would be experienced by light input into the first end 3 and reflected by the grating 1. The second group delay 29 is the group delay that would be experienced by light input into the second end 91 and reflected by the grating 1. The reflectivity 20 is the reflectivity that would be measured from either the first end 3 or the second end 91.

The waveguide 2 may comprise a core 13 and a cladding 14.

The maximum reflectivity 16 may be greater than 90%. The maximum reflectivity 16 may be greater than 99%. The maximum reflectivity 16 may be greater than 99.9%.

The first group delay variation 17 may be between 0.1 ps and 50 ps, and the second group delay variation 18 may be between 0.1 ps and 50 ps. The first group delay variation 17 may be between 0.1 ps and 20 ps, and the second group delay variation 18 may be between 0.1 ps and 20 ps. The first group delay variation 17 may be between 0.1 ps and 5 ps, and the second group delay variation 18 may be between 0.1 ps and 5 ps.

Figure 2:
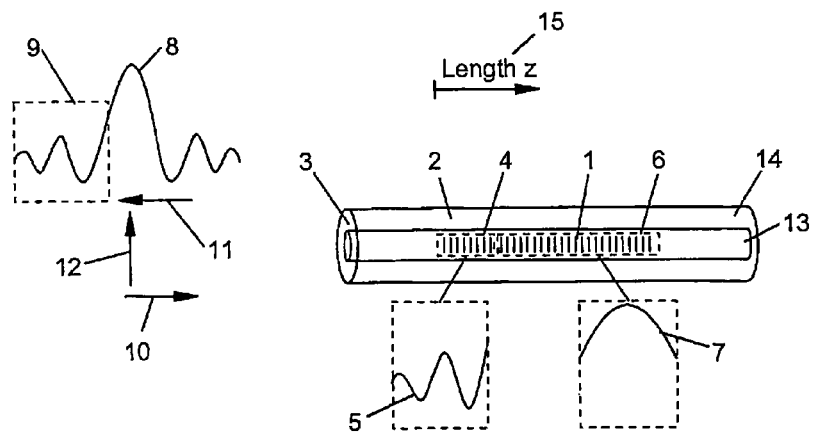
FIG. 2 shows a grating comprising a first and a second reflector.

FIG. 2 shows a grating 1 which comprises a first reflector 4 having a first refractive index profile 5, and a second reflector 6 having a second refractive index profile 7. The first reflector 4 is connected to the second reflector 6. The grating 1 is characterised by a first impulse response 8 defined with respect to the first end 3. The first refractive index profile 5 is proportional to a truncation 9 of the first impulse response 8.

FIG. 2 shows optical radiation 10 input into the grating 1 and reflected light 11. The first impulse response 8 is the response of the grating 1 to an impulse 12 as the optical radiation 10 propagates along the length 15 of the grating 1. By impulse response there is meant the impulse response of the baseband equivalent filter as further described with reference to FIGS. 3 to 6.

The waveguide 2 can comprise a core 13 and a cladding 14. The waveguide 2 can be an optical fibre or a planar waveguide. At least part of the core 13 and cladding 14 is photosensitive so that a grating 1 can be written into the waveguide 2.

Figure 3:
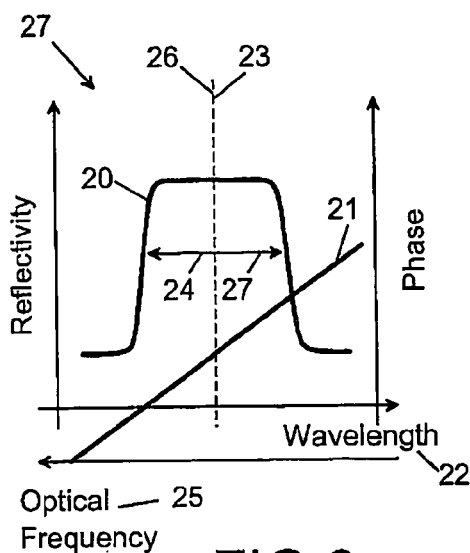
FIG. 3 shows the bandpass frequency response of a grating.

FIG. 3 shows the reflectivity 20 and phase 21 versus wavelength 22 for the grating 1. The grating 1 is characterised by a central wavelength 23 and a first bandwidth 24. The first bandwidth 24 is the bandwidth of the grating 1. Alternatively, the reflectivity 20 and phase 21 can be plotted against optical frequency 25 given by $f=c/\lambda$, where c is the speed of light in vacuum and $\lambda$ is the wavelength 22. The grating 1 is characterised by a central optical frequency 26 related to the central wavelength 23 by $f=c/\lambda$. The reflectivity 20 and phase 21 versus optical frequency 25 define a bandpass frequency response 27 of the grating 1.

Figure 4:
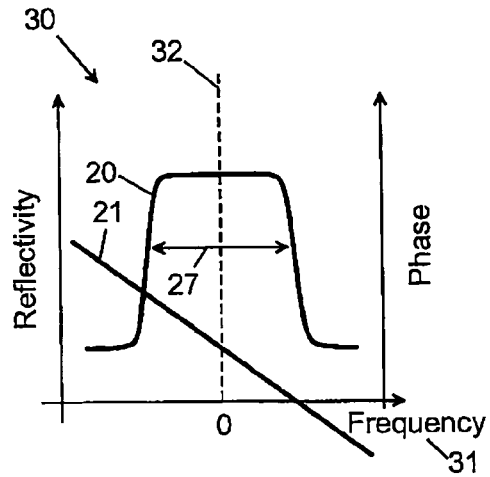
FIG. 4 shows the baseband equivalent frequency response of a grating.

FIG. 4 shows the reflectivity 20 and phase 21 plotted versus frequency 31 wherein the frequency 31 is the optical frequency 25 shifted such that the central frequency 32 is zero. The reflectivity 20 and phase 21 versus frequency 31 is referred to herein as the first frequency response 30. The first frequency response 30 is the baseband equivalent frequency response of the grating 1 with reference to the first end 3. In other words, the first frequency response 30 is the frequency response of the baseband equivalent filter.

Figure 5:
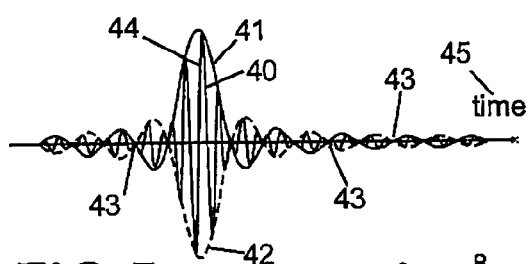
FIG. 5 shows the inverse Fourier Transform of the bandpass frequency response.

FIG. 5 shows the inverse Fourier Transform 40 of the bandpass frequency response 27 defined with reference to FIG. 3. The inverse Fourier Transform 40 comprises a modulation 44 with time 45 having a frequency substantially equal to the central optical frequency 26. The modulation 44 has a profile 41 and a negative profile 42. The profile 41 and the negative profile 42 comprise an envelope function. The profile 41 has several zero crossings 43 representing π phase shifts of the modulation 44.

Figure 6:
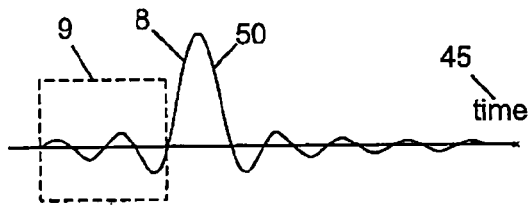
FIG. 6 shows the inverse Fourier Transform of the baseband frequency response.

FIG. 6 shows the inverse Fourier Transform 50 of the first frequency response 30 defined with reference to FIG. 4. The inverse Fourier Transform 50 is plotted versus time 45. The inverse Fourier Transform 50 is the same as the profile 41 defined in FIG. 5. The inverse Fourier Transform 50 is also the same as the impulse response 8, that is, the (baseband) first impulse response 8 of the grating 1 characterised by the first frequency response 30 is equal to the inverse Fourier Transform 50 of the first frequency response 30.

Figure 7:
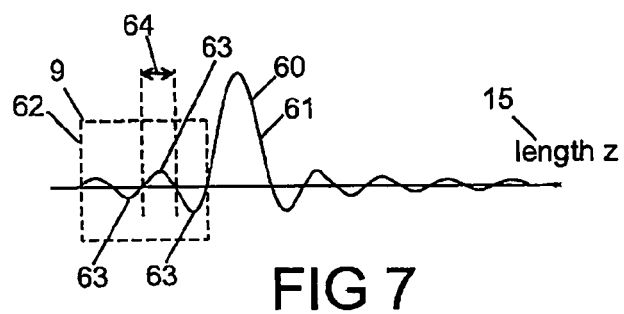
FIG. 7 shows the rescaled impulse response.

FIG. 7 shows the rescaled impulse response 60. The impulse response 60 is the first impulse response 8 shown in FIG. 6 rescaled in both time and amplitude. The time 45 has been rescaled and plotted as a function of length z 15 where the length is given by:

$$z = c \cdot t / (2 \cdot n_{eff})$$

where $n_{eff}$ is the effective index 65 (not shown) of optical radiation propagating in the waveguide 2 at the central wavelength 23. The effective index 65 is substantially the refractive index of the waveguide 2 for a weakly guiding waveguide such as those used in fibre-optics in optical telecommunication systems where the refractive index of the core 13 is approximately equal to the refractive index of the cladding 14. The amplitude of the first impulse response 8 has been rescaled to provide the refractive index profile 61, where the refractive index profile 61 n(z) is obtained from the first impulse response 8 h(t) by:

$$n(z) = FACTOR * h(z)$$

where the FACTOR is the constant of proportionality.

The truncation 62 of the refractive index profile 61 is the first refractive index profile 5. In other words, the first refractive index profile 5 is proportional to the truncation 62 of the impulse response 8, the proportionality being in both time to length and amplitude to refractive index. The first refractive index profile 5 is proportional to the truncation 62 of the inverse Fourier Transform 50.

The first refractive index profile 62 comprises several lobes 63, each having a width 64. For the substantially square filter shown in FIG. 3, the width 64 is substantially equal to the central wavelength 23 squared divided by the product of twice the effective index 65 (not shown) and the first bandwidth 24. The first bandwidth 24 is the bandwidth of the grating 1. It is important when performing this calculation that the same units (ie meters or nanometres) are used for the central wavelength 23 and the first bandwidth 24.

Referring to FIG. 2, the second refractive index profile 7 is preferably apodised. The second refractive index profile 7 may be symmetric or asymmetric about its centre.

The second refractive index profile 7 may be bell shaped, Gaussian shaped, have a Blackman apodised profile, a sinc profile, or a raised cosine profile. It is preferred that the first reflector 4 and the second reflector 6 are contiguous. Note that the first and second reflectors 4, 6 will be contiguous even if there is a π phase shift at the location where the first and second reflectors 4, 6 join. It is preferred that there are no discontinuities between the first and the second refractive index profiles 5, 7 even though there the first and second index profiles 5, 7 may contain at least one π phase shift. Note that the refractive index modulation corresponding to the lines of the grating 1 will have a π phase shift when the overall refractive index profile (comprising the first and second refractive index profiles 5 and 7) changes sign in an analogous manner to the π phase shifts of the modulation 44 at the zero crossing 43 shown in FIG. 5. Such a π phase shift is not meant to imply a break in the contiguous nature of the refractive index modulation or to represent a discontinuity. The reference to "lines" refers to the peaks of refractive index modulation along a grating, this modulation typically having a sinusoidal variation in a grating fabricated by exposing a photosensitive waveguide to UV light through a phase mask.

Figure 8:
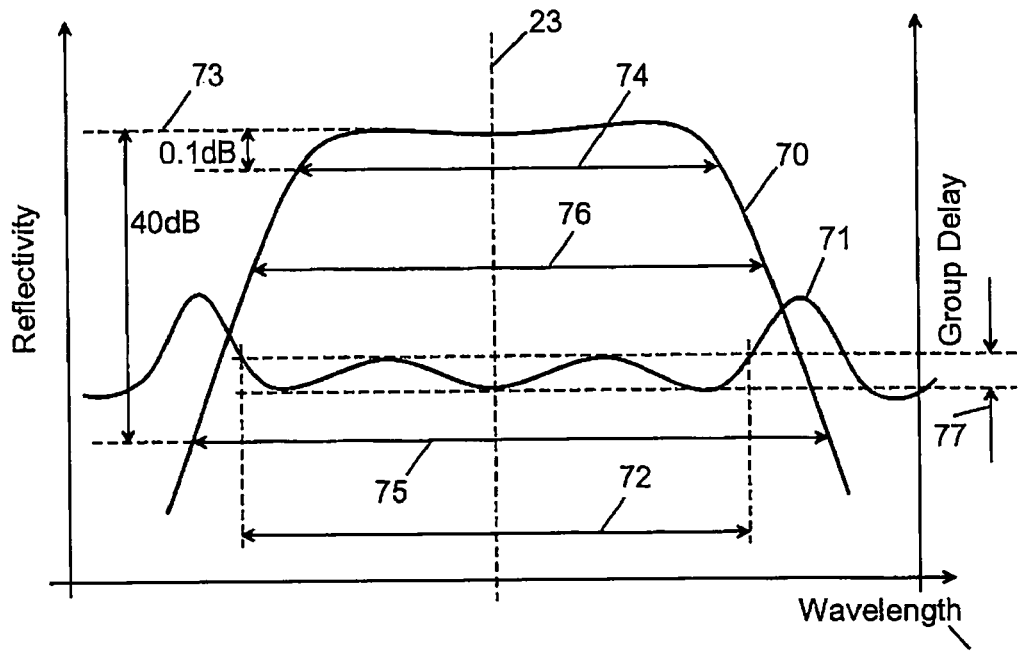
FIG. 8 shows a first reflectivity profile.

FIG. 8 shows a first reflectivity profile 70 and a first group delay 71 defined with respect to the first end 3 for a grating 1, wherein the first group delay 71 has been optimised by configuring the first and second reflectors 4, 6 to reduce the variation 77 in the first group delay 71 over an operating bandwidth 72 to an acceptable level. An acceptable level for a 10 GB/s WDM system is approximately 2 ps to 50 ps, or preferably 1 ps to 10 ps. An acceptable level for a 40 GB/s WDM system is approximately 0.5 ps to 5 ps, or preferably 0.1 ps to 2 ps. Also shown is the maximum reflectivity 73, a first bandwidth 74, a second bandwidth 75 and the −3 dB bandwidth 76. The first and second reflectors 4, 6 have been configured to ensure that the first reflectivity profile 70 is substantially uniform over the first bandwidth 74 and rolls off sharply at the edges of the first bandwidth 74. The first bandwidth 74 can be defined as being the −0.5 dB bandwidth. The second bandwidth 75 can be defined as being the −40 dB bandwidth. The ratio of the first bandwidth 74 ($BW_1$) to the second bandwidth 75 ($BW_2$) provides a measure of the squareness 78 $BW_1/BW_2$ (not shown) of the first reflectivity profile 70.

Alternatively, the first bandwidth 74 can be defined as the −0.1 dB bandwidth, or a bandwidth corresponding to a range between −0.1 dB and −1 dB. Alternatively, the second bandwidth can be defined as the bandwidth corresponding to a range between −25 dB and −50 dB.

Figure 9:
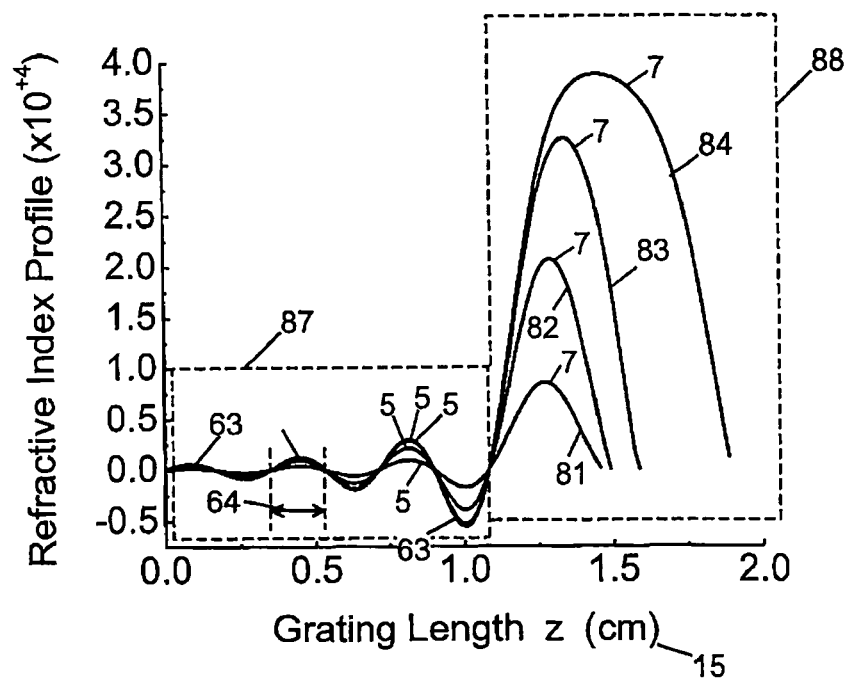
FIG. 9 shows refractive index profiles.

FIG. 9 shows the refractive index profiles 81, 82, 83, 84 of the grating 1 for maximum reflectivities 73 of 10%, 50%, 90% and 99.9% respectively. The refractive index profiles 81, 82, 83, 84 have been truncated in group 87 and group 88 to provide the first and second refractive index profiles 5, 7. The first refractive index profiles 5 scale with increasing maximum reflectivity 73. The second refractive index profiles 7 do not scale with increasing maximum reflectivity 73. The refractive index profiles 81, 82, 83, 84 were calculated using the layer peeling method defined in U.S. Pat. No. 6,445,852 which is hereby incorporated herein by reference. The refractive index profiles 81, 82, 83, 84 can be calculated using an inverse scattering method or other iterative or non-iterative analysis methods. The first refractive index profiles 5 comprise several lobes 63, each having a width 64. The width 64 is substantially equal to the central wavelength 23 squared divided by the product of the effective index 65 and the sum of the first and second bandwidths 74, 75. The first bandwidth 74 may be the −0.5 dB bandwidth and the second bandwidth may be the −40 dB bandwidth as shown with reference to FIG. 8.

Figure 10:
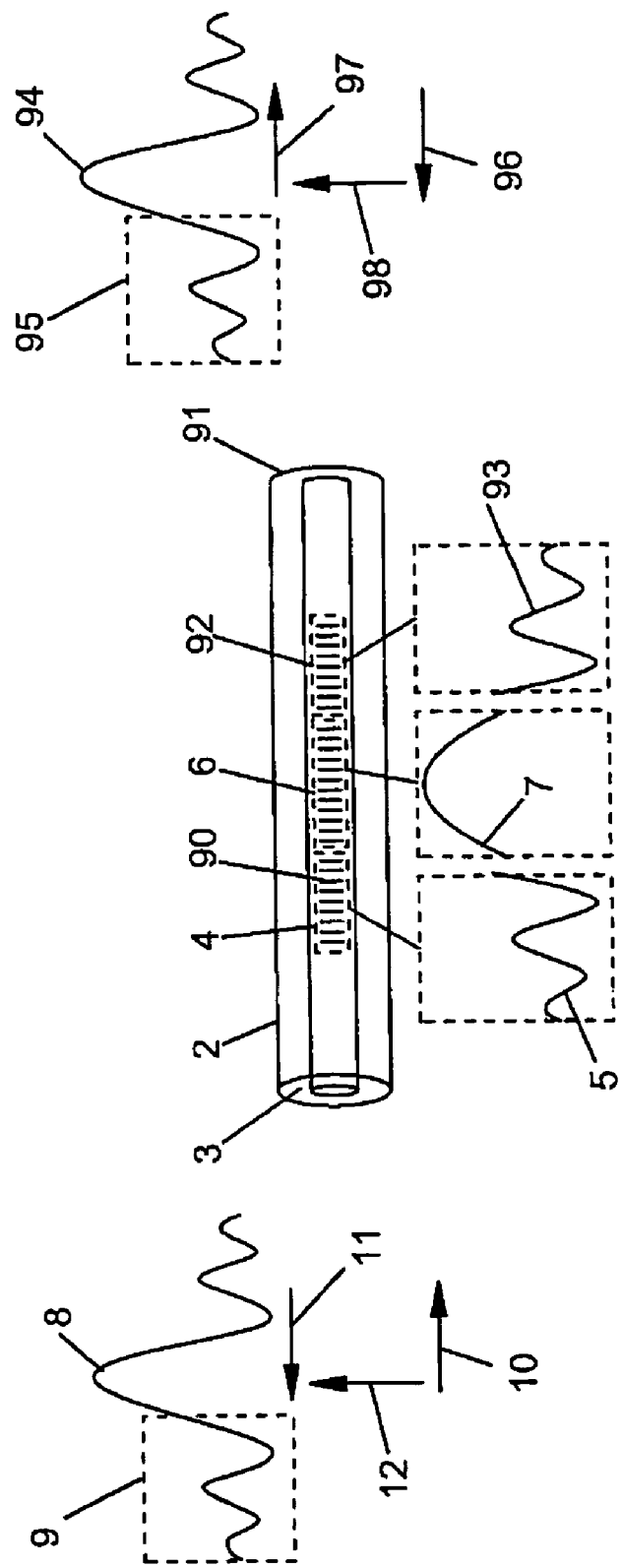
FIG. 10 shows a grating comprising a third reflector.

FIG. 10 shows a grating 90 that comprises a second end 91 connected to a third reflector 92 having a third refractive index profile 93, wherein the second reflector 6 is connected to the third reflector 92. The grating 90 is characterised by a second impulse response 94 defined with respect to the second end 91, wherein the third refractive index profile 93 is proportional to a truncation 95 of the second impulse response 94.

FIG. 10 shows optical radiation 96 input into the grating 90 and reflected light 97. The second impulse response 94 is the response of the filter to an impulse 98. The second impulse response 94 takes on the same meaning as the first impulse response 8, but with reference to light input into the second end 91.

Figure 11:
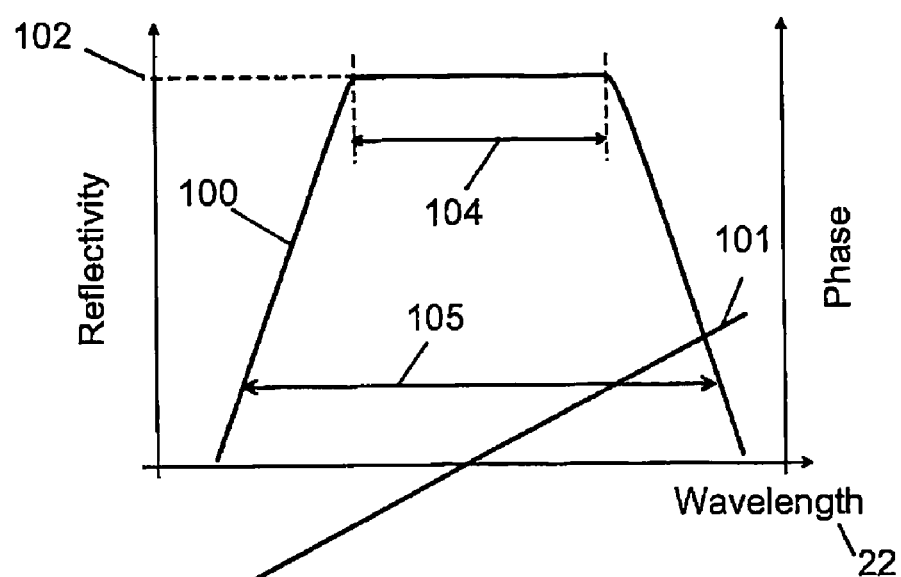
FIG. 11 shows the desired reflectivity and desired phase for an ideal grating.

FIG. 11 shows the desired reflectivity 100 and the desired phase 101 variation with wavelength 22 for an ideal grating 103 (not shown) having a maximum reflectivity 102, a first bandwidth 104 and a second bandwidth 105. The first bandwidth 104 is the −0.5 dB bandwidth, and the second bandwidth 105 is the −40 dB bandwidth. The desired phase 101 varies linearly with wavelength 22. The grating 103 has zero group delay variation with wavelength 22 and thus zero dispersion, has a constant reflectivity 100 over the first bandwidth 104 and the reflectivity 100 has a very sharp roll-off outside the first bandwidth—ie the difference between the second and first bandwidths 105, 104 is very much smaller than the first bandwidth 104. Preferably, the difference between the second and first bandwidths 105, 104 can be between 5% and 50% of the first bandwidth 104, and preferably between 5% and 25% of the first bandwidth 104.

Figure 12:
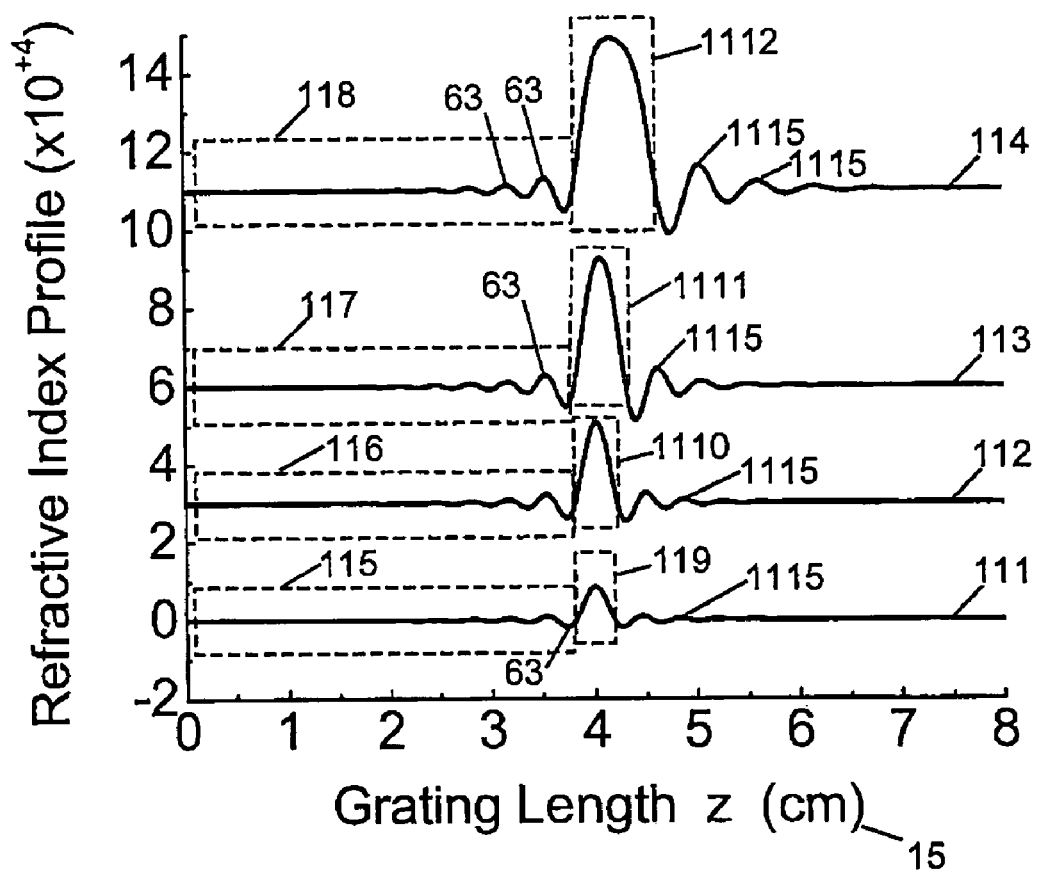
FIG. 12 shows the refractive index profiles for gratings having different reflectivities.

FIG. 12 shows the refractive index profiles 111, 112, 113, 114 of the grating 103 having the performance shown in FIG. 11 for maximum reflectivities 102 of 10%, 50%, 90% and 99.9% respectively. The profiles 111, 112, 113, 114 were calculated using the layer peeling method of U.S. Pat. No. 6,445,852. The profiles are shown offset vertically for clarity. The refractive index profiles 111, 112, 113, 114 of the grating 103 can be truncated to provide gratings comprising the first and second refractive index profiles 115 and 119, or 116 and 1110, or 117 and 1111, or 118 and 1112 respectively as shown. The higher the maximum reflectivity 102, the more asymmetric the refractive index profiles 111, 112, 113, 114 become.

The refractive index profiles 111, 112, 113, 114 of the grating 103 can be truncated to provide between one and twenty lobes 63, 1115 on either side of the second reflectors 119, 1110, 1111, 1112. The number of lobes 63, 1115 on either side of the second reflector 119, 1110, 1111, 1112 can be the same or different. The width of the lobes 63 is general smaller than the width of the lobes 1115, the difference in widths becoming more pronounced the higher the reflectivity of the grating. Such a grating 103 is a uni-directional grating, that is, the group delay is optimised (eg substantially linear over the bandwidth 104 of the grating) from one direction only.

Figure 13:
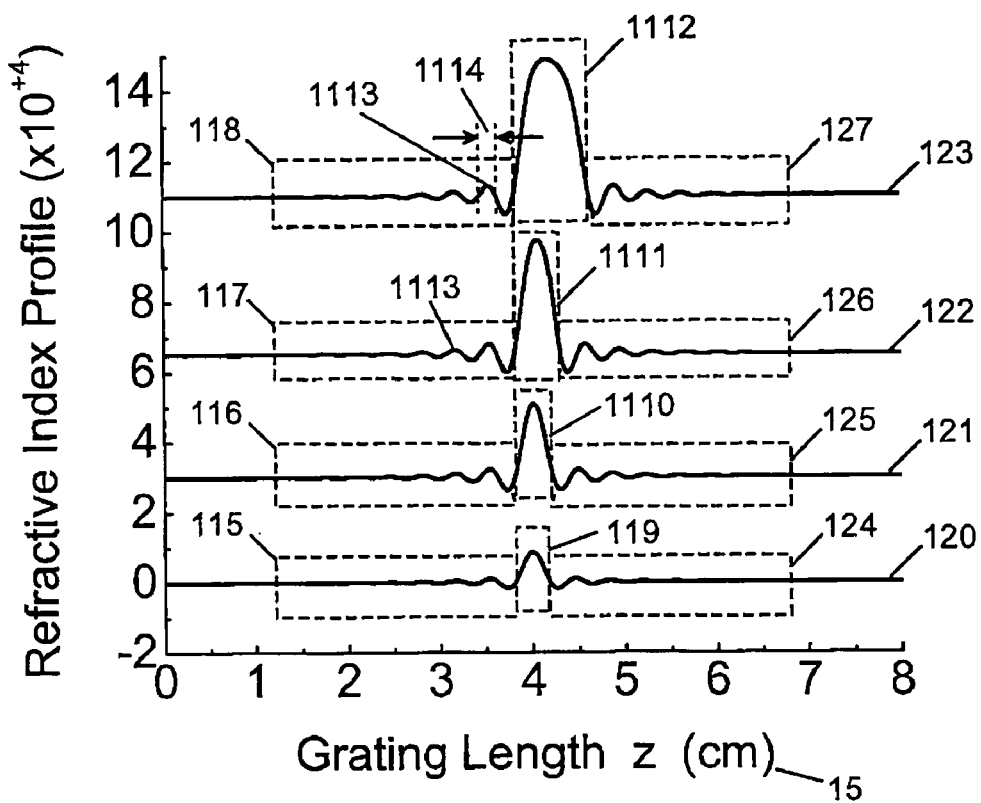
FIG. 13 shows the refractive index profiles of bidirectional gratings having different reflectivities.

FIG. 13 shows total refractive index profiles 120, 121, 122, 123 that comprise the first refractive index profiles 115, 116, 117, 118, the second refractive index profiles 119, 1110, 1111, 1112, and third refractive index profiles 124, 125, 126, 127. Note that the first and second refractive index profiles 115, 116, 117, 118, 119, 1110, 1111, 1112 are the same as those shown in FIG. 12. The third refractive index profiles 124, 125, 126, 127 are mirror images of the first refractive index profiles 115, 116, 117, 118. The first and third profiles 115 to 118 and 124 to 127 comprise lobes 1113 each having a width 1114. The total refractive index profiles 120, 121, 122, 123 of FIG. 13 are more symmetric than those shown in FIG. 12—but they still contain the asymmetry of the second refractive index profiles 119, 1110, 1111, 1112. The asymmetry of the second refractive index profiles 119, 1110, 1111, 1112 increases as the maximum reflectivity 102 increases. The maximum reflectivities of a grating having the total refractive index profiles 120, 121, 122, 123 are approximately 10%, 50%, 90% and 99.9% respectively.

Figure 14:
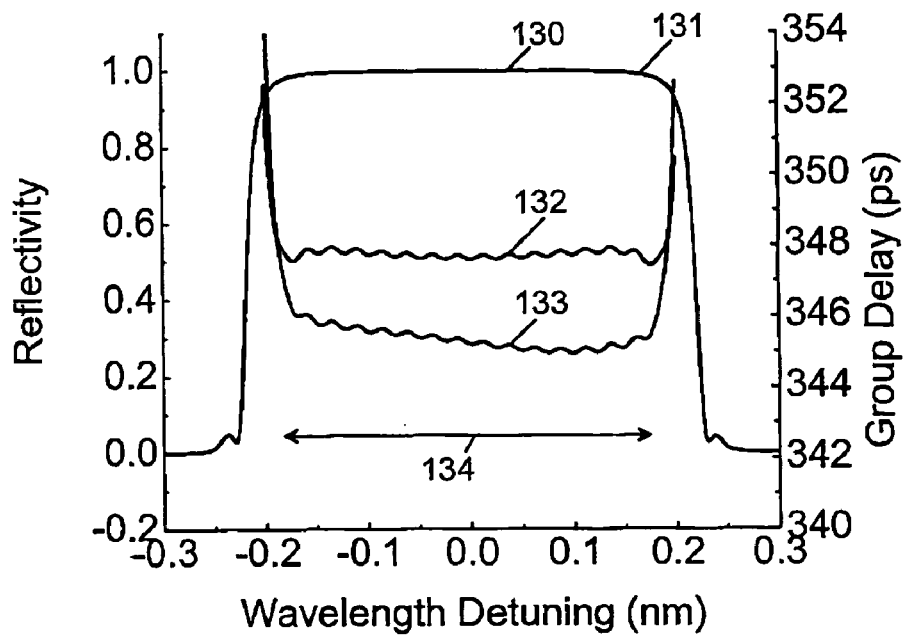
FIG. 14 shows reflectivity profiles and group delays.

FIG. 14 shows the first and second reflectivity profiles 130, 131 and first and second group delays 132, 133 (offset from each other for clarity) versus wavelength corresponding to a grating having the total refractive index profile 123. These were calculated using the layer peeling algorithms described in U.S. Pat. No. 6,445,852. The amplitudes of the first and second reflectivity profiles 130 and 131 are equal to each other. The first group delay 132 is substantially linear over the passband 134. However the second group delay 133 is substantially curved over the passband 134. This curvature is a direct result of the asymmetry of the second refractive index profile 1112. Referring to FIG. 13, the lobes 1113 have a width 1114, that is substantially equal to the central wavelength 23 squared divided by the product of the effective index 65 and the sum of the first and second bandwidths 104, 105.

Figure 15:
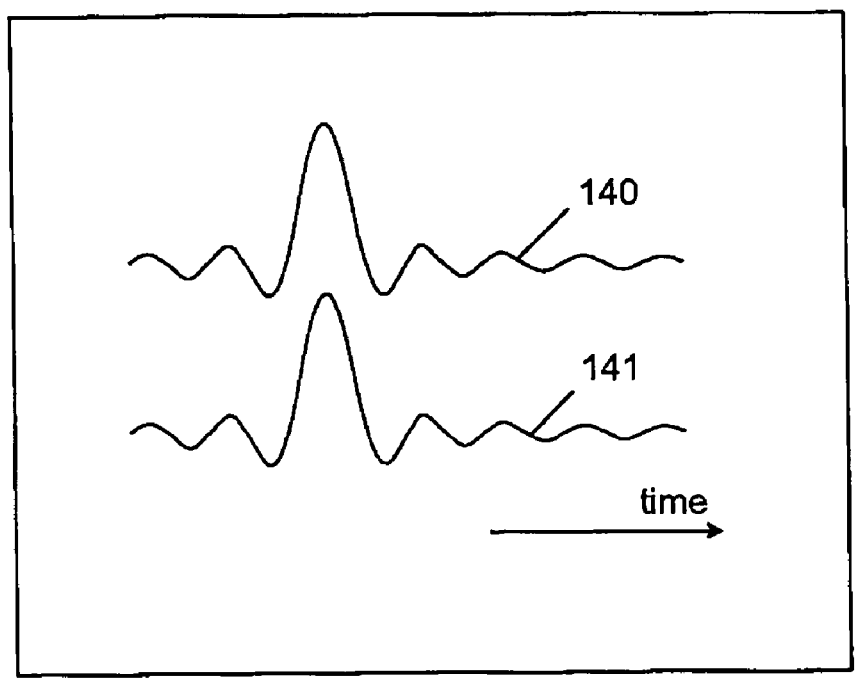
FIG. 15 shows the first and second impulse responses.

FIG. 15 shows the first and second impulse responses 140, 141. The first and second impulse responses 140, 141 are the inverse Fourier Transforms of the first and second reflectivity profiles 130, 131 and the corresponding first and second group delays 132, 133. The first refractive index profile 118 is proportional to a truncation of the first impulse response 140, and the third refractive index profile 127 is proportional to a truncation of the second impulse response 141.

Figure 16:
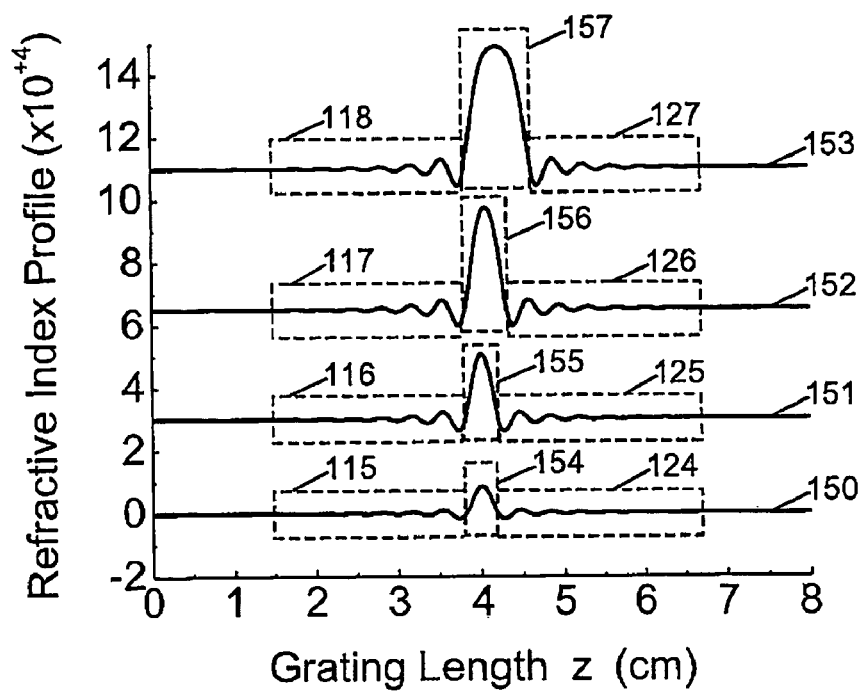
FIG. 16 shows refractive index profiles for symmetric bidirectional gratings.

FIG. 16 shows total refractive index profiles 150, 151, 152, 153 comprising the first and the third refractive index profiles 115, 116, 117, 118, 124, 125, 126, 127 of FIG. 13 and second refractive index profiles 154, 155, 156, 157. The second refractive index profiles 154, 155, 156, 157 were calculated using the layer peeling method of U.S. Pat. No. 6,445,852 by adjusting the second refractive index profiles 119, 1110, 1111, 1112 to make them symmetric about their centres and iterating the profiles until the calculated reflectivity 160 and the first and second group delays 161, 162 (offset for clarity) shown in FIG. 17 were sufficiently close to the desired characteristics. The refractive index profiles 150, 151, 152, 153 are substantially symmetrical, and hence the first and second group delays 161, 162 are substantially the same. Gratings fabricated using the refractive index profiles 150, 151, 152, 153 are preferred embodiments of the invention because they are symmetrical and bi-directional, and have nearly ideal (ie optimised) amplitude and group delay characteristics. Advantageously, the gratings are very short (between 1 cm to 5 cm long, depending on the desired performance) and have high maximum reflectivities.

Figure 17:
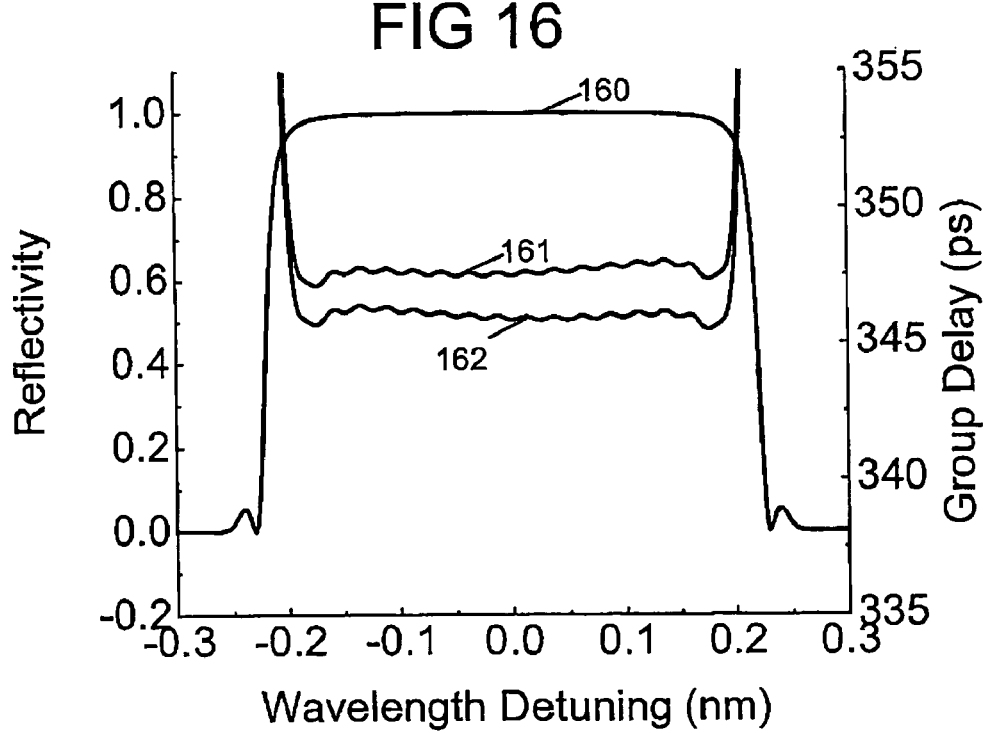
FIG. 17 shows the reflectivity profiles and group delays for a symmetric grating.

Similar gratings to those shown in FIG. 16 with corresponding performances shown in FIG. 17 can be designed for 2.5 GB/s, 10 GB/s and 40 GB/s systems (where GB/s is the unit for Giga bits per second). An optimised grating designed for a 2.5 GB/s system should have a first bandwidth between 0.02 to 0.05 nm, and a variation in group delay across the first bandwidth of between 20 ps and 200 ps. Such a grating would be between 30 mm and 200 mm long. An optimised grating designed for a 10 GB/s system should have a first bandwidth between 0.08 to 0.32 nm, and a variation in group delay across the first bandwidth of between 5 ps and 50 ps. Such a grating would be between 25 mm and 125 mm long. An optimised grating designed for a 40 GB/s system should have a first bandwidth between 0.32 to 1.22 nm, and a variation in group delay across the first bandwidth of between 0.1 ps and 20 ps, or between 0.1 ps and 5 ps, or preferably between 0.1 ps and 2 ps. Such a grating would be between 10 mm and 100 mm long. The invention has most applicability for the higher date rates, namely in 40 GB/s systems that are operated over long distances (>5 km), or in 10 GB/s systems that are operated over long distances (>20 km).

Figure 18:
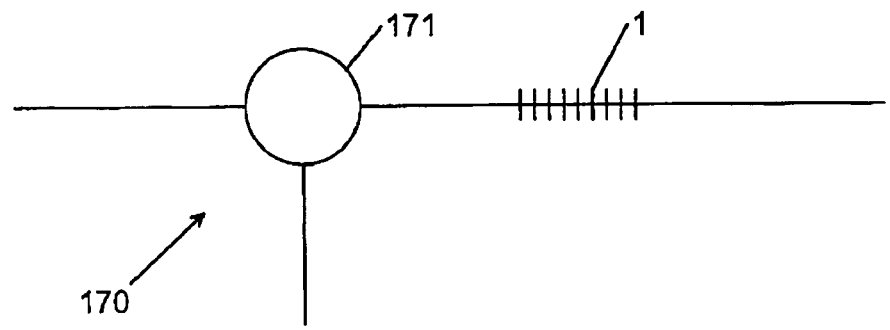
FIG. 18 shows a grating connected to a coupler.

FIG. 18 shows an apparatus 170 comprising a first coupler 171 connected to a grating 1. The first coupler 171 may be a fused coupler, a waveguide coupler, a waveguide splitter, or a beam splitter. The first coupler 171 is preferably a circulator. The apparatus 170 may be used to add or drop wavelength channels in an optical telecommunication network. The apparatus 170 may contain several gratings 1 connected together in series, each having a different operating wavelength. The apparatus 170 may also contain an optical switch.

Figure 19:
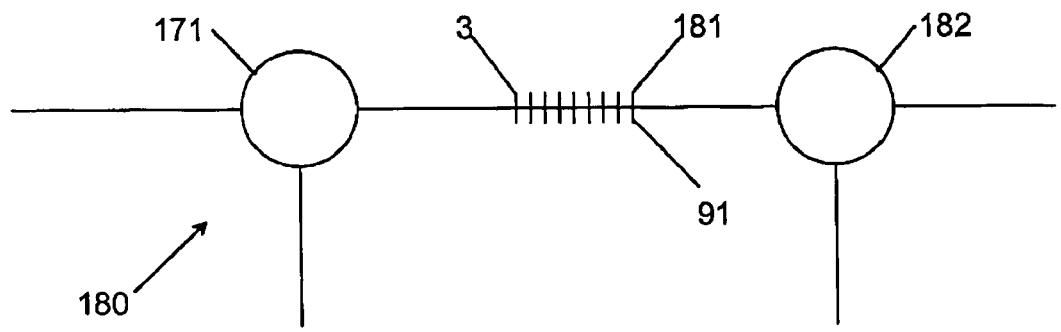
FIG. 19 shows a grating connected to two couplers.

FIG. 19 shows an apparatus 180 in which a bidirectional grating 181 is connected to a second coupler 182. The second coupler 182 may be a fused coupler, a waveguide coupler, a waveguide splitter, or a beam splitter. The grating 181 may have a reflectivity greater than 10%, 50% or 90% at the operating wavelength. It is preferable that the grating 181 has a reflectivity greater than 99% at the operating wavelength. It is preferable that the grating has zero dispersion at the operating wavelength measured from both the first end 3 and the second end 91. The apparatus 180 may contain several bi-directional gratings 180 connected together in series, each having a different operating wavelength. The apparatus 180 may also contain an optical switch. The apparatus 180 may be used as an add/drop multiplexer in an optical telecommunication network. The grating's bidirectionality and short length lead to significant cost advantages such as avoiding the use of two unidirectional, low dispersion gratings and an intervening isolator within the add/drop multiplexer.

Bragg Grating Design

Figure 20:
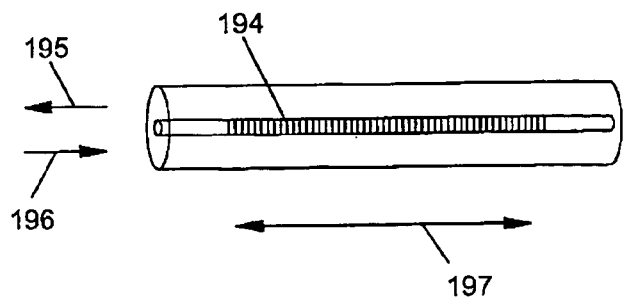
FIG. 20 shows a schematic of a grating.
Figure 21:
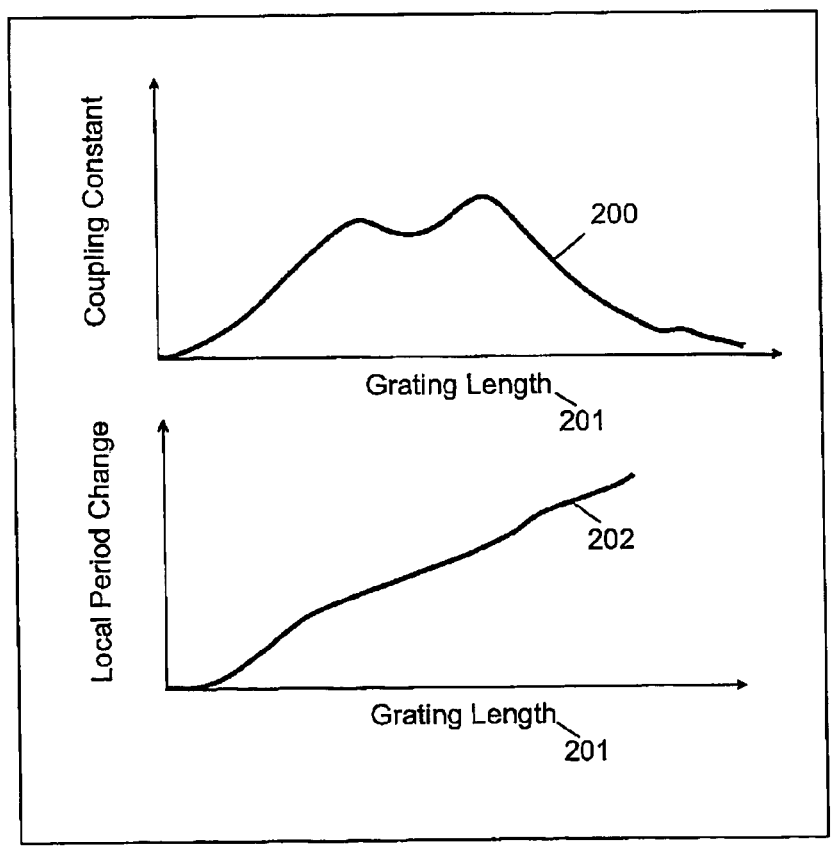
FIG. 21 shows the variation of coupling constant modulus versus length for a grating.
Figure 22:
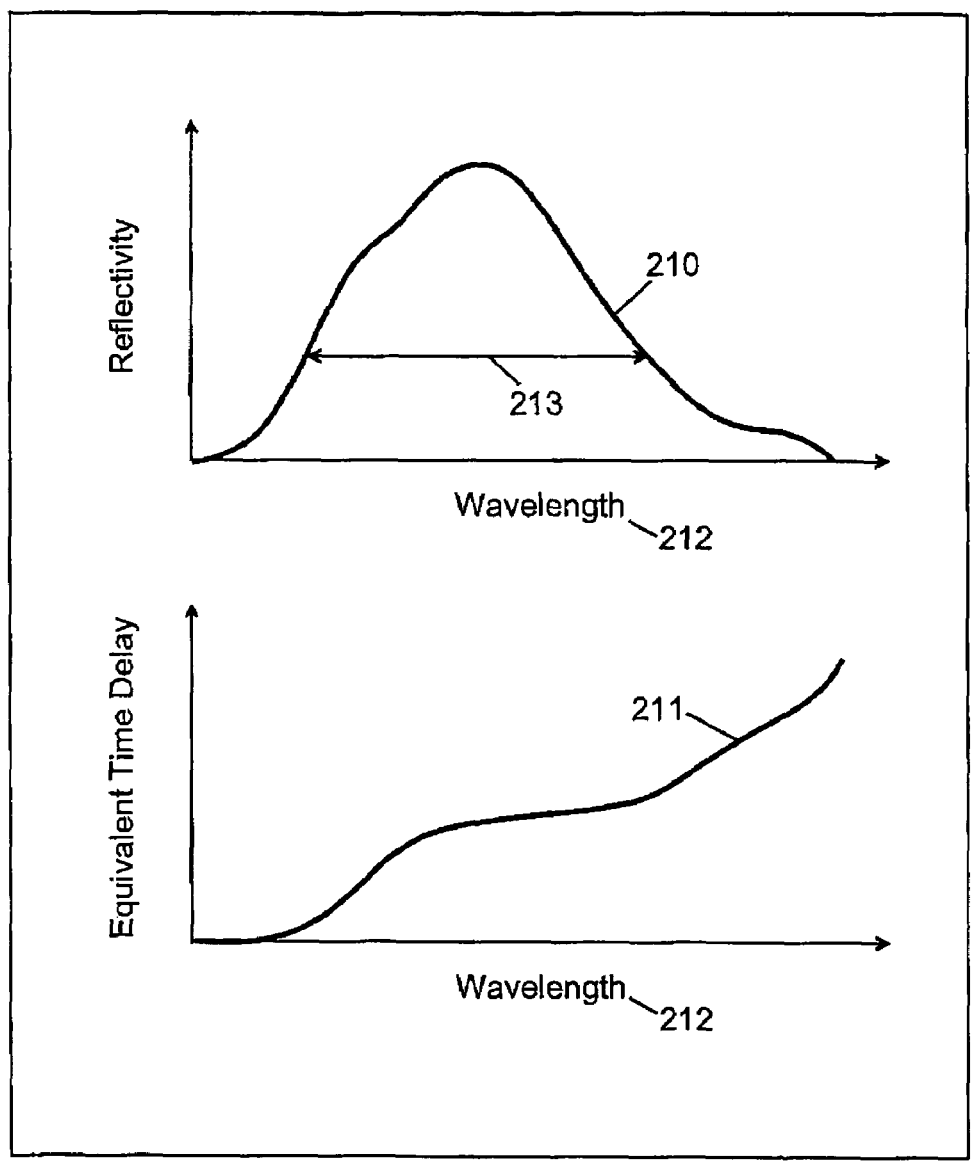
FIG. 22 shows the reflectivity spectrum as a function of wavelength.

FIG. 20 is a schematic of a fibre Bragg grating 194 of length $L_{gr}$ 197 showing also the input light 196 and the reflected light 195. FIG. 21 shows a schematic of the variation of the coupling constant modulus $|\kappa(z)|$ 200 and the local-period change $\Delta\Lambda(z)$ variation 202, along the grating length z 201. FIG. 22 shows a schematic of the reflectivity spectrum $R(\lambda)$ 210 and the corresponding group delay $\Delta\tau(\lambda)$ 211, as a function of the wavelength $\lambda$ 212, over the grating bandwidth BW. By the word "bandwidth" or "band" there is meant a wavelength range in which a substantial proportion of the optical radiation is reflected. The grating bandwidth 213 can be the –3 dB bandwidth.

Fibre Bragg Gratings (FBGs) can be characterised in terms of their period uniformity and the spatial variation of refractive-index modulation (apodisation profile). The refractive index variation along the FBG length is, generally, given by:

$$n(z) = n_0\{1 + 2h(z)\cos[K_0 z + \phi(z)]\} \quad (1)$$

where $n_0$ is the fibre effective refractive index, h(z) describes the amplitude variation of the induced refractive-index modulation, $K_0 = 2\pi/\Lambda_0$ is the reference Bragg wavevector ($\Lambda_0$ is the reference Bragg period). $\phi(z)$ is used to express the slowly varying spatial phase along the grating length, as well as specific phase shifts at particular points. z is the coordinate measured along the grating axis. In the case, for example, of linearly chirped gratings $\phi(z) = K_0 C z^2$, where C (in m$^{-1}$) is the chirp parameter, while for standard uniform gratings $\phi(z)$ is constant (usually taken as zero). The reference Bragg period $\Lambda_0$ is typically of the order of 0.1 μm to 1 μm. The slowly varying grating phase $\phi(z)$ corresponds to a slowly varying local grating period $\Lambda(z)$ given by:

$$\Lambda(z) = \Lambda_0 \left(1 - \frac{\Lambda_0}{2\pi}\frac{d\phi(z)}{dz}\right) \quad (2)$$

The difference $$\Delta\Lambda(z) = \Lambda(z) - \Lambda_0 = -\frac{\Lambda_0^2}{2\pi}\frac{d\phi(z)}{dz} \quad (3)$$

defines the local period change.

The index modulation h(z) is, in general, expressed as $h(z) = h_0 f(z)$, where $h_0$ is the peak refractive-index modulation and $f(z)$ is the apodisation profile. The grating coupling constant $\kappa(z)$ is, in general, a complex number with a magnitude $|\kappa(z)|$ that is proportional to the modulus of the refractive-index modulation h(z) and a phase $\arg[\kappa(z)]$ that depends on the local period change $\Delta\Lambda(z)$. Therefore, the grating can be fully described by $|\kappa(z)|$ and the local period change $\Delta\Lambda(z)$.

The grating reflection coefficient is, in general, a complex number expressed as:

$$r_0(\lambda) = |r_0(\lambda)| e^{+i\theta(\lambda)} \quad (4)$$

where $|r_0(\lambda)|$ denotes the modulus of the reflection coefficient and $\theta(\lambda)$ is the relative phase of the reflected light at the grating input end. The grating reflectivity R is given by $$R(\lambda) = |r_0(\lambda)|^2 \quad (5)$$

The group delay $\Delta\tau(\lambda)$, associated with the grating reflection, is given by:

$$\Delta\tau(\lambda) = \frac{n_0}{c_0}\frac{d\theta(\lambda)}{d\beta} = -\frac{\lambda^2}{2\pi c_0}\frac{d\theta(\lambda)}{d\lambda} \quad (6)$$

where $c_0$ is the phase velocity of light in vacuum, $\beta$ is the propagation constant in the fibre, and $\lambda$ is the free-space wavelength.

The reflectivity spectrum $R(\lambda)$ and the group delay $\Delta\tau(\lambda)$ of the light reflected by a grating, which is characterised by a coupling constant $|\kappa(z)|$ and local-period change $\Delta\Lambda(z)$, can be calculated by a number of different methods such as coupled-mode theory, transfer-matrix method, or Bloch wave analysis. This procedure is usually called a grating analysis process. Practical gratings can be fully characterised using a number of different measurement set-ups and methods.

The opposite process can also be followed. Given a desired reflectivity spectrum $R(\lambda)$ and group delay $\Delta\tau(\lambda)$, the corresponding unique grating structure, which is characterised by a coupling constant $|\kappa(z)|$ and local-period change $\Delta\Lambda(z)$, can be determined. This procedure is usually called grating synthesis or grating design. Gratings can be designed using Fourier-transform-based methods or more advanced integral and differential Inverse Scattering (IS) techniques.

EXAMPLES

Figure 23:
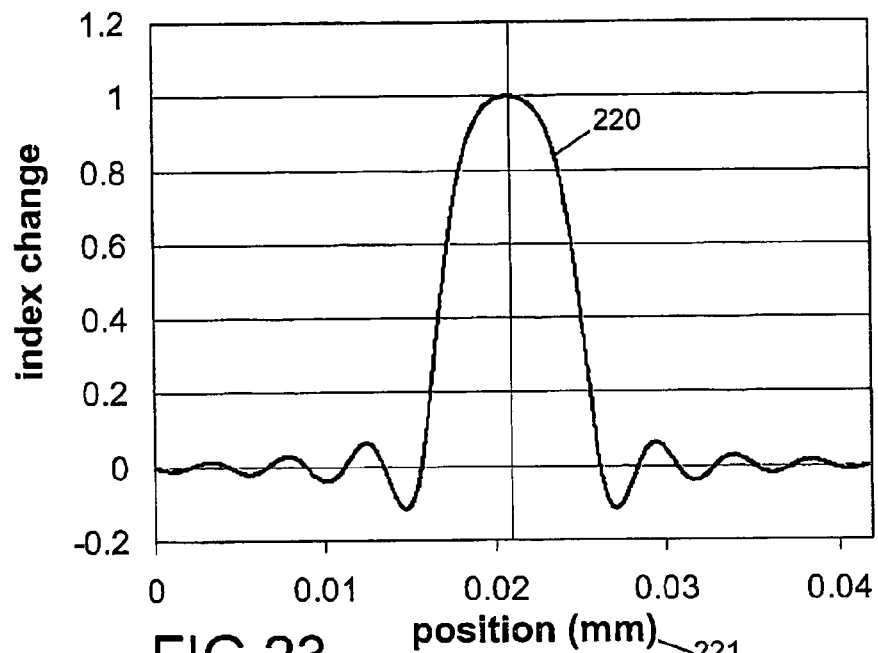
FIG. 23 shows the design of a refractive index profile for a grating.
Figure 24:
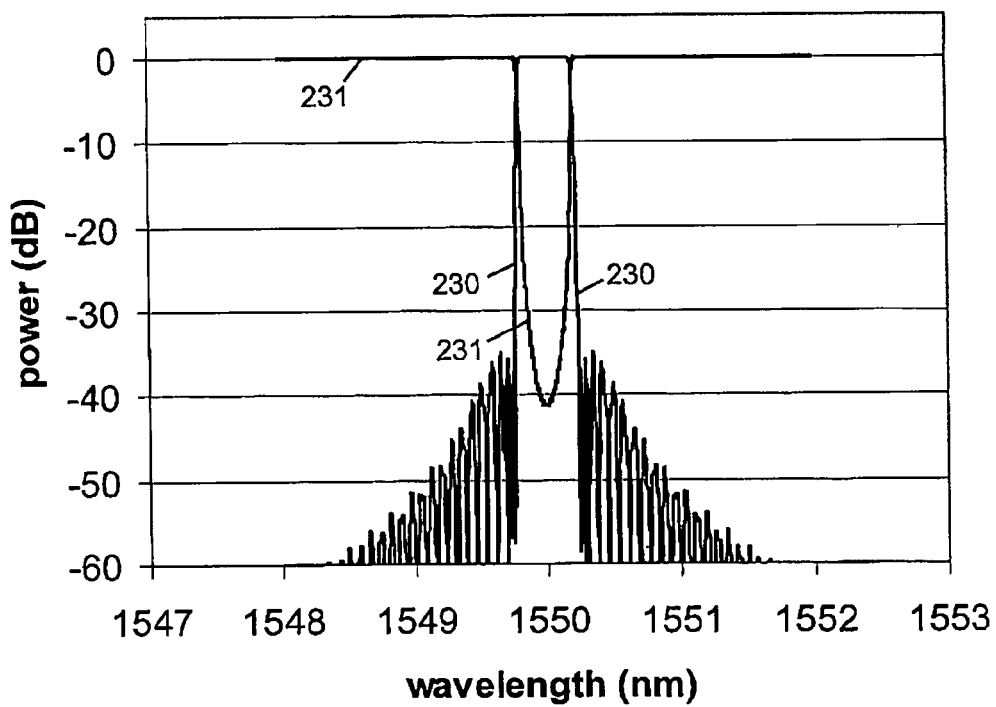
FIG. 24 shows the predicted reflectivity for the grating of FIG. 23.
Figure 25:
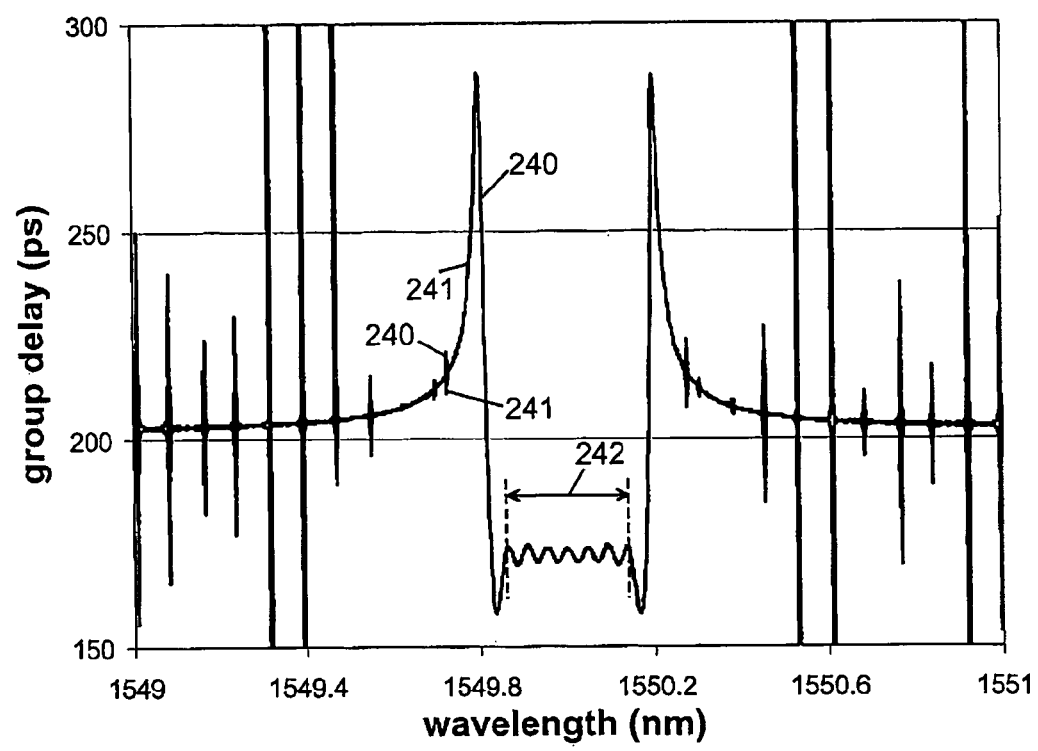
FIG. 25 shows the predicted group delay for the grating of FIG. 23.

FIG. 23 shows the design of a refractive index profile 220 for a grating versus the position 221 along the length of a grating 255 (not shown) in mm that has been manufactured and for which measurement results are presented. The refractive index profile 220 is symmetric. The refractive index profile 220 has been normalised so that its peak is unity. The refractive index profile 220 is the profile that has been inscribed into the grating. FIG. 24 shows the predicted reflectivity 230 and predicted transmission 231 of the grating. Note that the reflectivity 230 and transmission 231 is the same as measured from either end of the grating, that is the first reflectivity profile defined with respect to the first end 3 is equal to the second reflectivity profile defined with respect to the second end 91. FIG. 25 shows the predicted first group delay 240 and predicted second group delay 241 of the grating. The first and second group delays 240, 241 essentially overlay. There is an operating bandwidth 242 of the grating over which the peak to peak variation in the first and second group delays 240, 241 is less than 5 ps.

Figure 26:
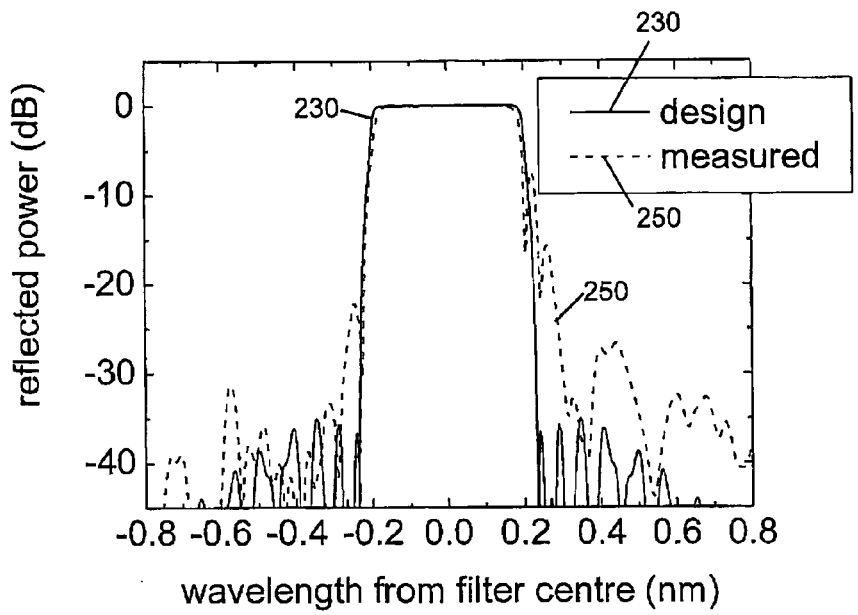
FIG. 26 shows the measured reflectivity for a grating manufactured in accordance with the design of FIG. 23.
Figure 27:
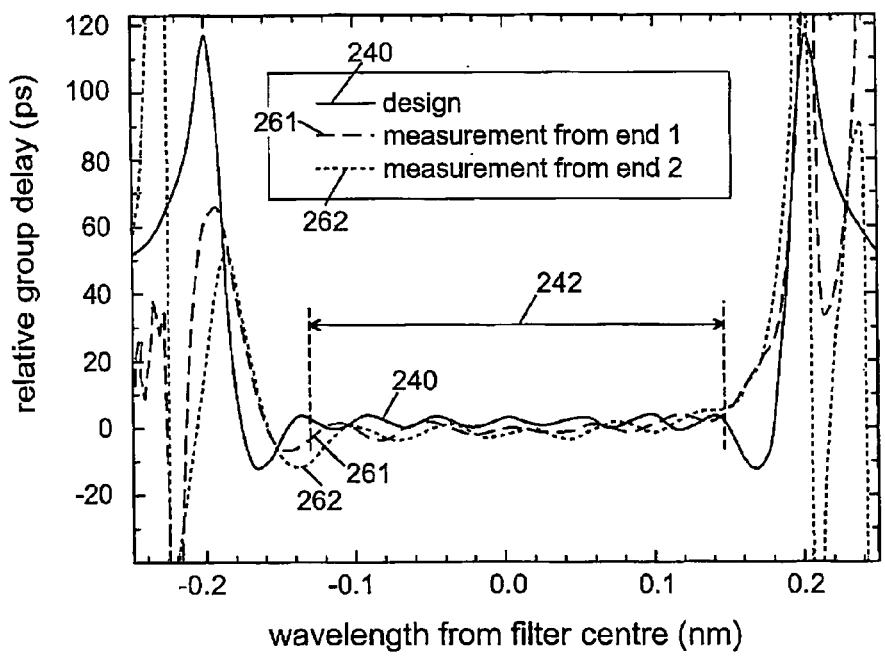
FIG. 27 shows the measured group delays for a grating manufactured in accordance with the design of FIG. 23.

FIG. 26 shows the measured reflectivity 250 of the grating 255 manufactured according to the design shown in FIG. 23. FIG. 27 shows the measured first and second group delays 261, 262. The first and second group delays 261, 262 are substantially equal to each other over the operating bandwidth 242. The maximum reflectivity of the grating was greater than 99.97% and the variation in the first and second group delays 261, 262 over the operating bandwidth 242 is less than 10 ps. The performance of the grating 255 is ideal for application in an add-drop multiplexer of the type shown in FIG. 19.

Figure 28:
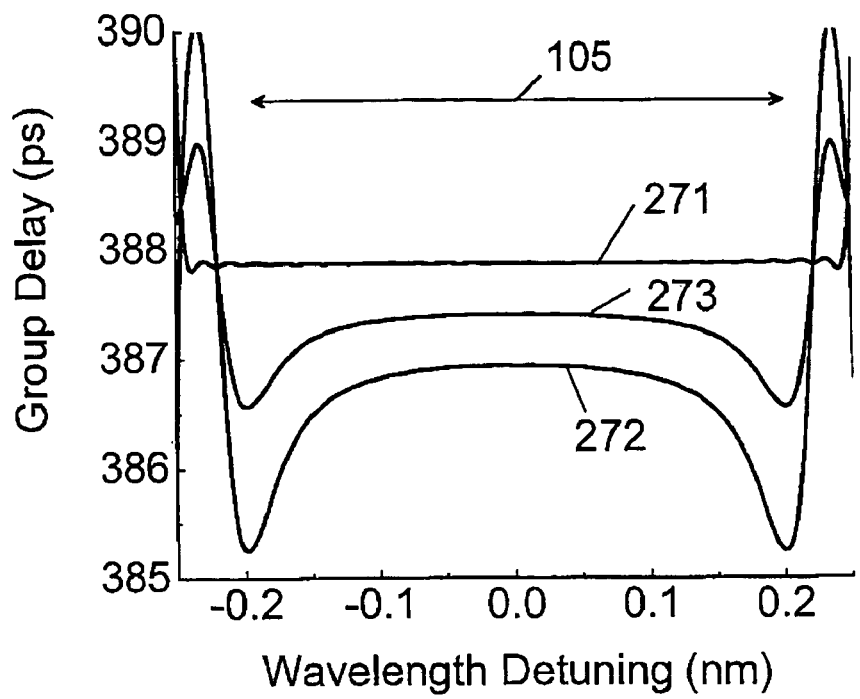
FIG. 28 shows the first and second group delays for a unidirectional grating.

FIG. 28 shows the first and second group delay 271, 272 and the third group delay 273 for the grating 270 (not shown) having the refractive index profile 111 (ie not truncated) shown in FIG. 12. The third group delay 273 is the group delay for the signal in transmission through the grating. Note that the first group delay 271 is constant over the second bandwidth 105. The first and second group delays 271, 272 are different from each other. The grating 270 is a uni-directional grating and is suitable for the apparatus shown in FIG. 18, but not suitable for the apparatus shown in FIG. 19 where a bi-directional grating is required.

Figure 29:
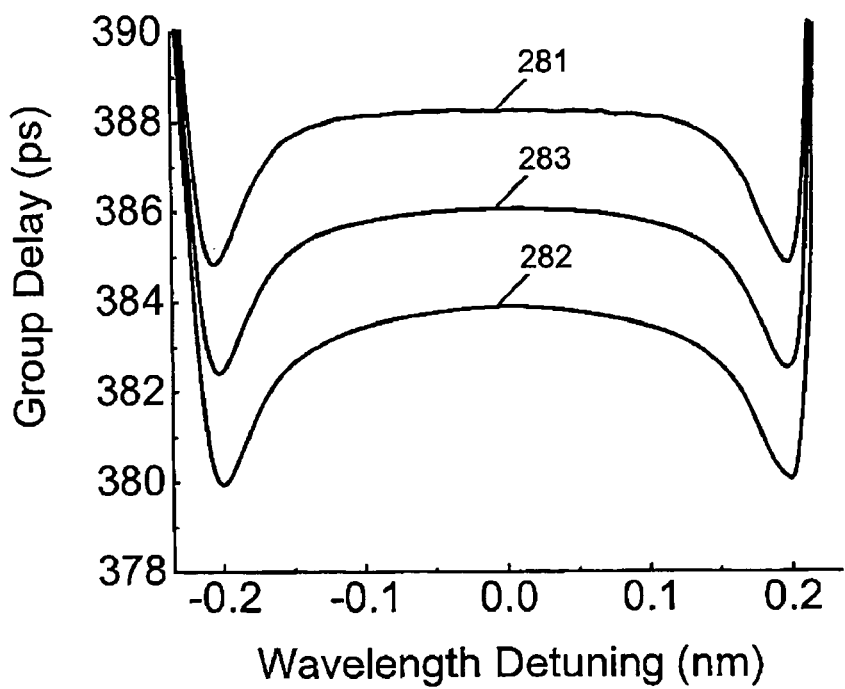
FIG. 29 shows the first and second group delays for a bi-directional grating.

FIG. 29 shows the first and second group delays 281, 282 and the third group delay 283 for the grating 280 (not shown) having the refractive index profile 120 shown in FIG. 13. The first, second and third group delays 281, 282, 283 are similar, although the first group delay 281 is flatter over a wider wavelength detuning range than the second group delay 282. The grating 280 is more bi-directional than the grating 270. It is nevertheless surprising that the small asymmetry in the refractive index profile 120 (corresponding to a maximum reflectivity of only 10%) results in such a difference between the first group delay 281 and the second group delay 282.

Figure 30:
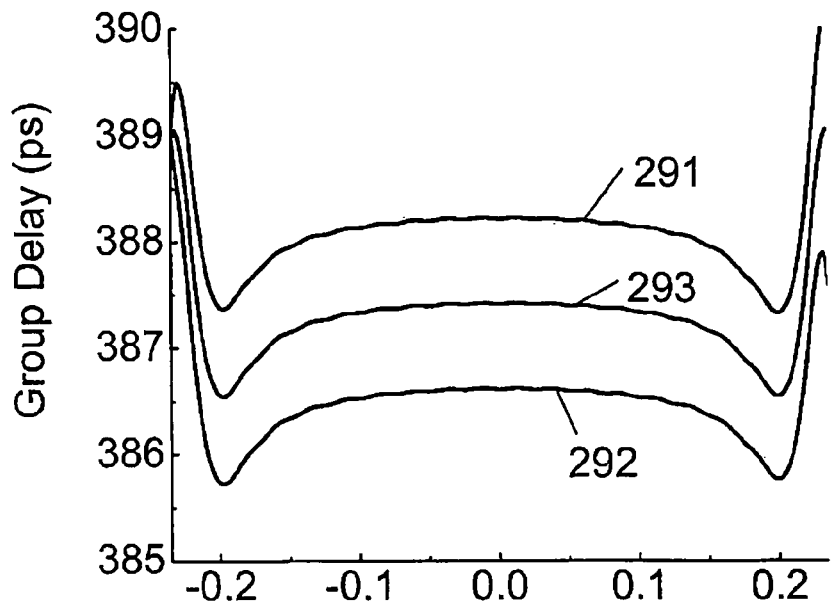
FIG. 30 shows the first and second group delays for a symmetric bi-directional grating.

FIG. 30 shows the first and second group delays 291, 292 and the third group delay 293 for the grating 290 (not shown) having the refractive index profile 150 shown in FIG. 16. The first, second and third group delays 291, 292, 293 have been offset from each other for clarity. The first, second and third group delays 291, 292, 293 are substantially identical. The grating 290 is a symmetrical, bi-directional grating, is a preferred embodiment of the invention, and is suitable for use in the apparatus shown in FIG. 19.

Figure 31:
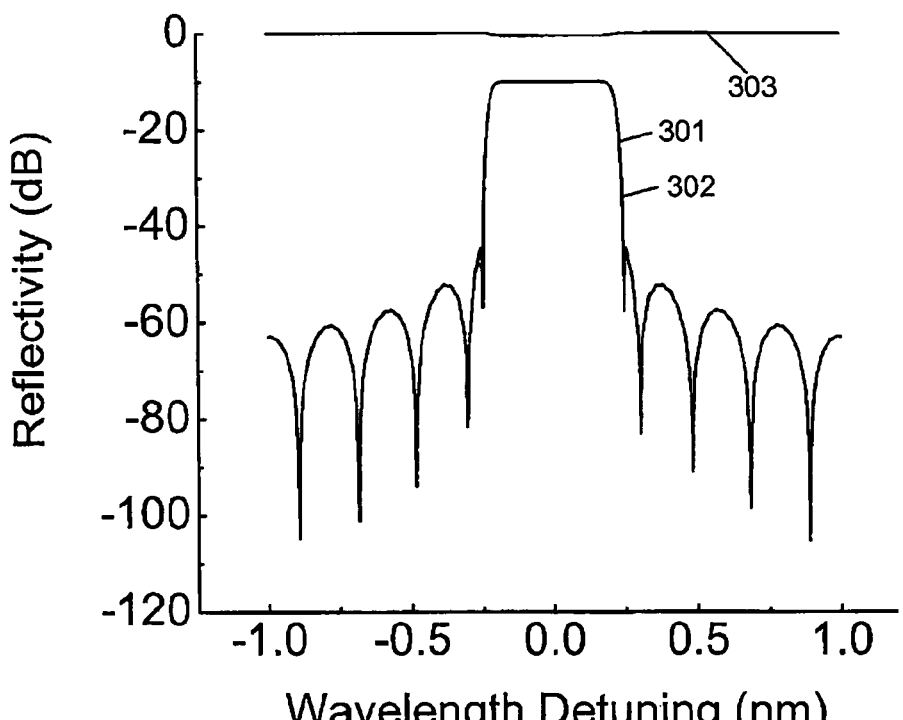
FIG. 31 shows the first and second reflectivity profiles for a symmetric bi-directional grating.

FIG. 31 shows the transmission 303, and the first and second reflectivity profiles 301, 302 for the grating 290.

It is surprising that the differences in the first and second group delays shown in FIGS. 28 and 29 are so marked even when the reflectivity of the gratings was only 10%.

Although the grating designs shown here reflect at a single wavelength band, gratings can also be designed using the same principles that reflect at a plurality of wavelength bands. Design processes for multiband gratings can be found in International Patent No. PCT WO0231552A1, which is hereby incorporated herein by reference. It is preferred that the average group delays of at least two of these wavelength bands are not equal to each other.

Group delay results presented in the figures described above have been defined using small wavelength bandwidths. This results in the ripple in the calculated and measured group delays (see for example FIGS. 17 and 27). Group delay and dispersion results are sometimes presented using a larger wavelength bandwidth which results in an averaging of the variation over the bandwidth of the grating. In this instance, the resulting group delay variations can be reduced substantially, by as much as a factor of ten. The ranges for the first group delay variation 17 and the second group delay variation 18 defined herein would therefore be reduced to around 0.01 ps and 100 ps (the higher limit being subject to a real curvature of the group delay variation such as that shown in FIG. 14).

It is to be appreciated that the embodiments of the invention described above with reference to the accompanying drawings have been given by way of example only and that modifications and additional components may be provided to enhance performance.

The present invention extends to the above mentioned features taken separately or in any combination.

What is claimed is:

1. An apparatus for filtering optical radiation at an operating wavelength, comprising a waveguide, and wherein a grating is written into the waveguide and the grating is defined by a first end and a second end, and the grating comprises:
   a first reflector defined by a first refractive index profile;
   a second reflector defined by a second refractive index profile;
   a third reflector defined by a third refractive index profile; and wherein:
   the first end is connected to the first reflector, the first reflector is connected to the second reflector, and the second reflector is connected to the third reflector;
   the grating is defined by a first bandwidth, a maximum reflectivity, a first group delay variation with respect to the first bandwidth and the first end, a second group delay variation with respect to the first bandwidth and the second end, a first impulse response defined with respect to the first end, and a second impulse response defined with respect to the second end; and
   the first refractive index profile is proportional to a truncation of the first impulse response, the second refractive index profile is proportional to a truncation of the second impulse response, the maximum reflectivity is greater than 50%, the first group delay variation is between 0.1 ps and 100 ps, and the second group delay variation is between 0.1 ps and 100 ps.

2. The apparatus of claim 1 and further comprising a first coupler, and wherein the grating is connected to the first coupler.

3. The apparatus of claim 2 and further comprising a second coupler, and wherein the grating is connected to the second coupler.

4. The apparatus of claim 3 wherein the second coupler is a circulator.

5. The apparatus of claim 2 wherein the first coupler is a circulator.

6. The apparatus of claim 1 wherein the maximum reflectivity is greater than 90%.

7. The apparatus of claim 6 wherein the maximum reflectivity is greater than 99%.

8. The apparatus of claim 7 wherein the maximum reflectivity is greater than 99.9%.

9. The apparatus of claim 1 wherein the first group delay variation is between 0.1 ps and 50 ps, and the second group delay variation is between 0.1 ps and 50 ps.

10. The apparatus of claim 9 wherein the first group delay variation is between 0.1 ps and 20 ps, and the second group delay variation is between 0.1 ps and 20 ps.

11. The apparatus of claim 10 wherein the first group delay variation is between 0.1 ps and 5 ps, and the second group delay variation is between 0.1 ps and 5 ps.

12. The apparatus of claim 1 wherein the second refractive index profile is symmetric about its center.

13. The apparatus of claim 12 wherein the second refractive index profile is bell shaped, is Gaussian shaped, is a Blackman apodised profile, is a sinc profile, or is a raised cosine profile.

14. The apparatus of claim 1 wherein the first and second reflectors are configured such that the first group delay varies substantially linearly with wavelength over the first bandwidth.

15. The apparatus of claim 14 wherein the first and second reflectors are configured such that the first group delay has a substantially zero linear variation with wavelength over the first bandwidth.

16. The apparatus of claim 1 wherein the grating is defined by a first reflectivity profile defined with respect to the first end, and wherein the first and second reflectors are configured to optimize the first reflectivity profile.

17. The apparatus of claim 16 wherein the grating is defined by a second reflectivity profile defined with respect to the second end, and the second and third reflectors are configured to optimize the second reflectivity profile.

18. The apparatus of claim 1 wherein the grating is further defined by a central wavelength, a second bandwidth, and an effective index, and the first reflector comprises at least one lobe having a width substantially equal to the central wavelength squared divided by the product of the effective index and the sum of the first and second bandwidths.

19. The apparatus of claim 18 wherein the third reflector comprises at least one lobe having a width substantially equal to the central wavelength squared divided by the product of the effective index and the sum of the first and the second bandwidths.

20. The apparatus of claim 1 wherein the grating is further defined by a first frequency response defined with respect to the first end, and the first refractive index profile is proportional to a truncation of an inverse Fourier Transform of the first frequency response.

21. The apparatus of claim 20 wherein the grating is further defined by a second frequency response defined with respect to the second end, and the third refractive index profile is proportional to a truncation of an inverse Fourier Transform of the second frequency response.

22. The apparatus according to claim 1 wherein the second refractive index profile is apodised.

23. The apparatus of claim 1 wherein the second refractive index profile is asymmetric about its center.

24. The apparatus of claim 1 wherein the second and third reflectors are configured to optimize the second group delay.

25. The apparatus of claim 1 wherein at least a portion of each of the first and third reflectors are symmetrically disposed about the second reflector.

26. The apparatus of claim 1 wherein the grating is defined by a total refractive index profile comprising the first, second and third refractive index profiles, and wherein the total refractive index profile is substantially symmetric about its centre.

27. The apparatus of claim 1 wherein the grating is defined by a refractive index and a length over which the refractive index is modulated, wherein the length is between 5 mm and 50 mm and the first bandwidth is between 0.01 nm and 5 nm.

28. The apparatus of claim 1 wherein the grating is symmetrical.

29. An add-drop multiplexer for dropping a wavelength channel and adding a wavelength channel, comprising:
   a waveguide comprising a grating written into the waveguide;
   a first coupler connected to the grating;
   a second coupler connected to the grating;
   and wherein:
   the grating is defined by a first end and a second end, and the grating comprises:
   a first reflector defined by a first refractive index profile;
   a second reflector defined by a second refractive index profile;
   a third reflector defined by a third refractive index profile;
   and wherein:
      the first end is connected to the first reflector, the first reflector is connected to the second reflector, and the second reflector is connected to the third reflector;
      the grating is defined by a first bandwidth, a maximum reflectivity, a first group delay variation with respect to the first bandwidth and the first end, a second group delay variation with respect to the first bandwidth and the second end, a first impulse response defined with respect to the first end, and a second impulse response defined with respect to the second end; and
      the first refractive index profile is proportional to a truncation of the first impulse response, the second refractive index profile is proportional to a truncation of the second impulse response, the maximum reflectivity is greater than 50%, the first group delay variation is between 0.1 ps and 100 ps, and the second group delay variation is between 0.1 ps and 100 ps.

30. The add-drop multiplexer of claim 29 wherein the grating has substantially zero dispersion at the operating wavelength measured from both the first end and the second end.

* * * * *